(12) United States Patent
Berry et al.

(10) Patent No.: US 6,229,779 B1
(45) Date of Patent: May 8, 2001

(54) PHYSICAL PLAY-IN-PLACE AUDIO COMPACT DISC JEWEL CASE

(75) Inventors: Richard Edmond Berry, Georgetown; Scott Anthony Morgan; John Martin Mullaly, both of Austin, all of TX (US); David John Roberts, Stockton (GB); Craig Ardner Swearingen, Austin, TX (US); Anthony Christopher Courtney Temple, Hellidon (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,627

(22) Filed: Jun. 29, 1998

(51) Int. Cl.[7] ............................. G11B 33/02; B65D 85/57
(52) U.S. Cl. ...................................... 369/75.1; 206/308.1
(58) Field of Search .................................. 369/77.2, 77.1, 369/291, 75.1, 75.2; 206/308.1

(56) References Cited

U.S. PATENT DOCUMENTS 5,642,344 * 6/1997 Yamada et al. ..................... 369/77.2

FOREIGN PATENT DOCUMENTS 2-94092 * 4/1990 (JP).
5-266645 * 10/1993 (JP).
5-344183 * 12/1993 (JP).
7-50065 * 2/1995 (JP).

* cited by examiner

Primary Examiner—Brian E. Miller
Assistant Examiner—Kenneth W. Fields
(74) Attorney, Agent, or Firm—Leslie A. VanLeeuwen; Felsman, Bradley, Vaden, Gunter & Dillon, LLP

(57) ABSTRACT

A physical play-in-place case for housing and playing a media disc, such as an audio compact disc (CD). The case comprises a base, a shell attached to the base defining a cavity for receiving a CD, the shell further having a landing portion defining a spine area extending substantially along a common side of the base and the shell, and a cover hinged to the base along the spine area. Playback controls are located at the landing portion of the shell and extend into the spine area. At least one audio output device is located in the shell. A track/time display can also be located at the landing portion of the shell. In a further embodiment, a graphic display panel is attached to the cover, and may be viewed when the cover is in the closed position. A touch screen may be operatively combined with the graphic display panel. The case can be fabricated in the same size as conventional CD jewel cases, i.e., with dimensions no greater than about 14 cm×12.5 cm×10 cm.

9 Claims, 3 Drawing Sheets

PHYSICAL PLAY-IN-PLACE AUDIO COMPACT DISC JEWEL CASE

BACKGROUND OF THE INVENTION

1. Field of the Invention

The present invention generally relates to packaging systems and media presentation systems, and more particularly to a packaging system designed for a media article (such as audio compact disc), in which the packaging itself becomes the media playing device (e.g., a CD player).

2. Description of Related Art

Media storage and presentation systems have advanced greatly in recent years. Early media articles used magnetic recording technology to preserve information, such as audio products in the form of 8-track tapes, cassette tapes, and digital audio tapes, or video products in the form of VHS and Betamax video tapes. Current technology trends have resulted in various media storage articles which rely on optical technology to store and playback information, including audio compact discs (CDs), and video laser discs. As the name implies, these discs are generally flat and circular in shape, and are constructed of a material which can be manipulated on a microscopic level to either reflect light or pass light. In this manner, a binary sequence can be constructed on the optical media, which contains digitized multimedia information.

Media articles that bear optically-readable information are often considered superior to magnetic articles, particularly due to the high information density provided by optical techniques, the non-contact nature of optical reading, and the durability of the optical media. As with the earlier magnetic articles, however, these optical discs still require protective packaging to prevent the discs from getting scratched, or otherwise damaged by external contaminants. A typical "jewel" case for an audio CD is shown in FIG. 1A (closed) and in FIG. 1B (open).

Jewel case 1 has a top cover 2 which is hinged to a base 3 at two hinge points, one of which is indicated at 4. A rigid retainer piece 5 (see FIG. 1B) is located within case 1, and a landing portion 6 formed integrally with retainer 5 is raised along the hinge line, forming a spine area (along the left side of case 1 as depicted). Cover 2 is usually fabricated of a clear material such that a printed sheet 7 can be enclosed, which includes visual information such as a picture or text associated with the packaged media (the audio CD). Another sheet (not shown) can be placed between retainer 5 and base 3. Case 1 is fairly small, about 14 cm×12.5 cm×10 cm, based on a CD having a radius of about 6 cm and a thickness of about one to three millimeters. Case 1 is thus sized to be only nominally larger than the media it retains.

An audio CD 8 is held by retainer 5 using a plurality of small, resilient fingers or tines 9 having bent ends that together form a small, circle within the center hole of CD 8. Tines 9 are sized to create a circle that is of slightly greater diameter than the center hole of the CD, but tines 9 can be depressed to effectively shrink the diameter of this circle. In this manner, tines 9 provide a releasable friction-fit with the inner surface of a CD's center hole.

When someone wants to listen to CD 8, he or she first opens case 1 (i.e., hinges cover 2 away from base 3), and then pushes against tines 9 to release CD 8 from retainer 5. The CD is then placed in a suitable player (CD players come in many different styles and sizes, including portable, battery-operated players). Opening of case 1 is a two-handed operation for all but the most dexterous persons, and two hands are similarly required to hold base 3 while pushing against tines 9. Even with two hands, it is often difficult to properly handle the CD as it is being taken out of case 1, i.e., without smudging the play surface of the CD, which can adversely affect playback. It is indeed unfortunate that the CD must be removed from the case at all since, even if the user is very careful, something else might affect the CD while it is exposed (i.e., before it has been placed in the player). For example, someone at a beach might accidentally kick sand or gravel into the CD and damage it in spite of otherwise proper handling.

In light of the foregoing, it would be desirable to devise a simple, protective package for media articles, such as audio CDs, which could itself be used to play back the media content, e.g., play music on a CD in-place within a jewel case, instead of requiring that the CD be removed from the jewel case and placed in some other CD player. It would be further advantageous if the new packaging designs could efficiently make use of space available in existing package formats.

SUMMARY OF THE INVENTION

It is therefore one object of the present invention to provide a protective package for media articles such as audio compact discs.

It is another object of the present invention to provide such a package which includes a self-contained player device allowing playback of the media content on the packaged article.

It is yet another object of the present invention to provide such a player/package which integrates additional presentation features to enhance the user interface with the player device.

The foregoing objects are achieved in a physical play-in-place case for housing and playing a media disc, such as an audio CD, the case generally comprising a base, a shell attached to the base defining a cavity for receiving a media disc, the shell further having a landing portion defining a spine area extending substantially along a common side of the base and the shell, means for reading data encoded on the media disc, and means, at least partially located in the spine area of the shell, for playing back media content contained in the encoded data. At least one audio output device is located in the shell. A cover is hinged to the base along the spine area such that the cover may be moved between an open position and a closed position, wherein the media disc may be accessed in the open position, and the media disc is protectively enclosed in the closed position. The case may be fabricated in the same size as conventional CD jewel cases, i.e., with dimensions no greater than about 14 cm×12.5 cm×10 mm. A replaceable battery provides power to the electronic system.

In the illustrated embodiment, the physical play-in-place case includes a plurality of controls located at the landing portion of the shell and extending into the spine area of the shell. The controls, may include, for example, a stop button, a play/pause button, a reverse button, a forward button, a volume control knob, and an on/off switch. In this embodiment, a track/time display is located at the landing portion of the shell. In a further embodiment, the playing means also includes a graphic display panel attached to the cover, such that the graphic display panel may be viewed when the cover is in the closed position. A touch screen may be operatively combined with the graphic display panel.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1A:
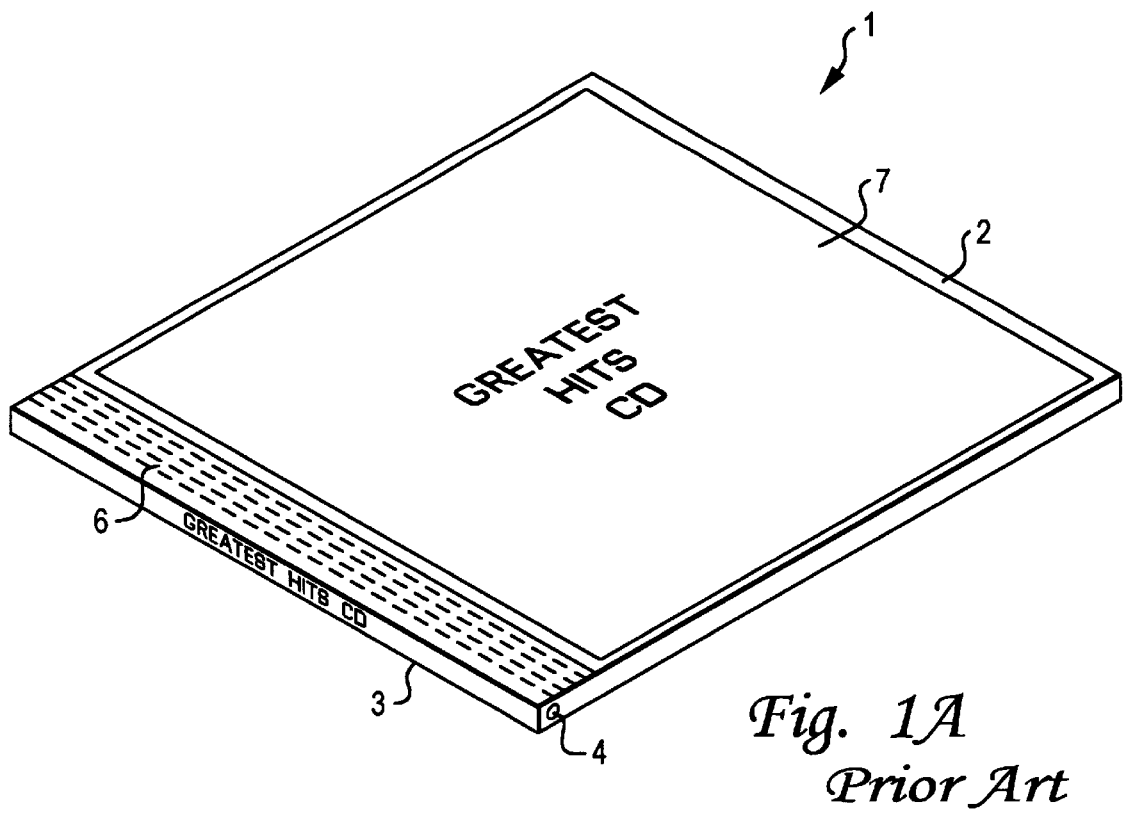
FIG. 1A is a perspective view of a conventional jewel case for housing an audio compact disc (CD), in the closed position.
Figure 1B:
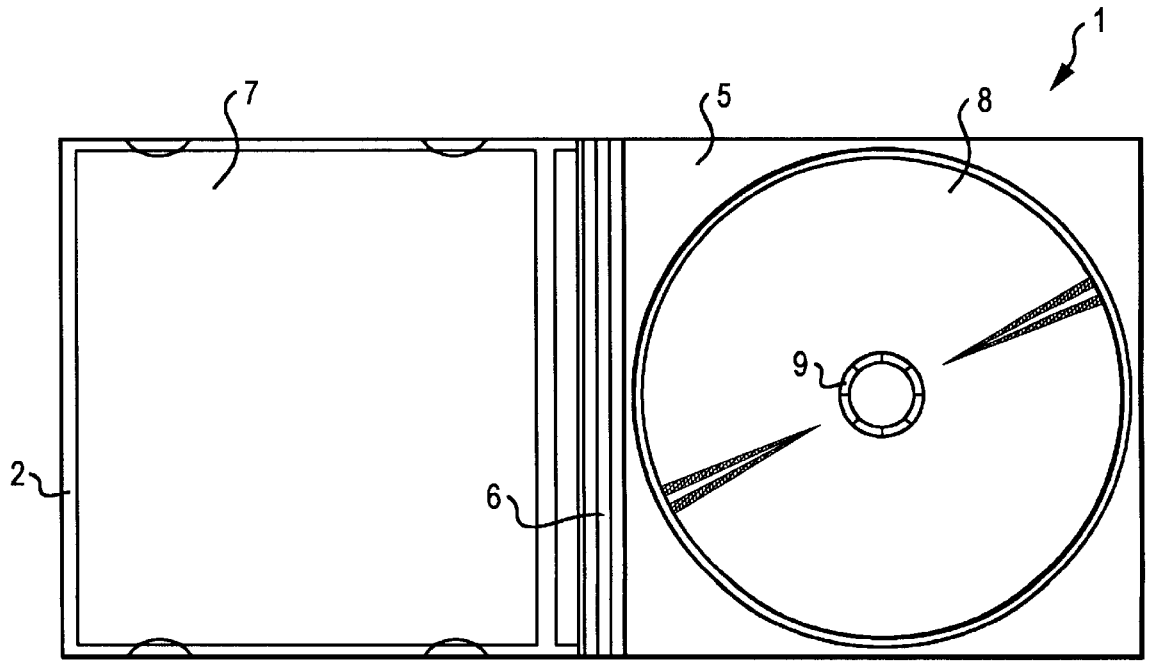
FIG. 1B is a top plan view of the prior art jewel case of FIG. 1A, in the open position, with a CD held therein.
Figure 2A:
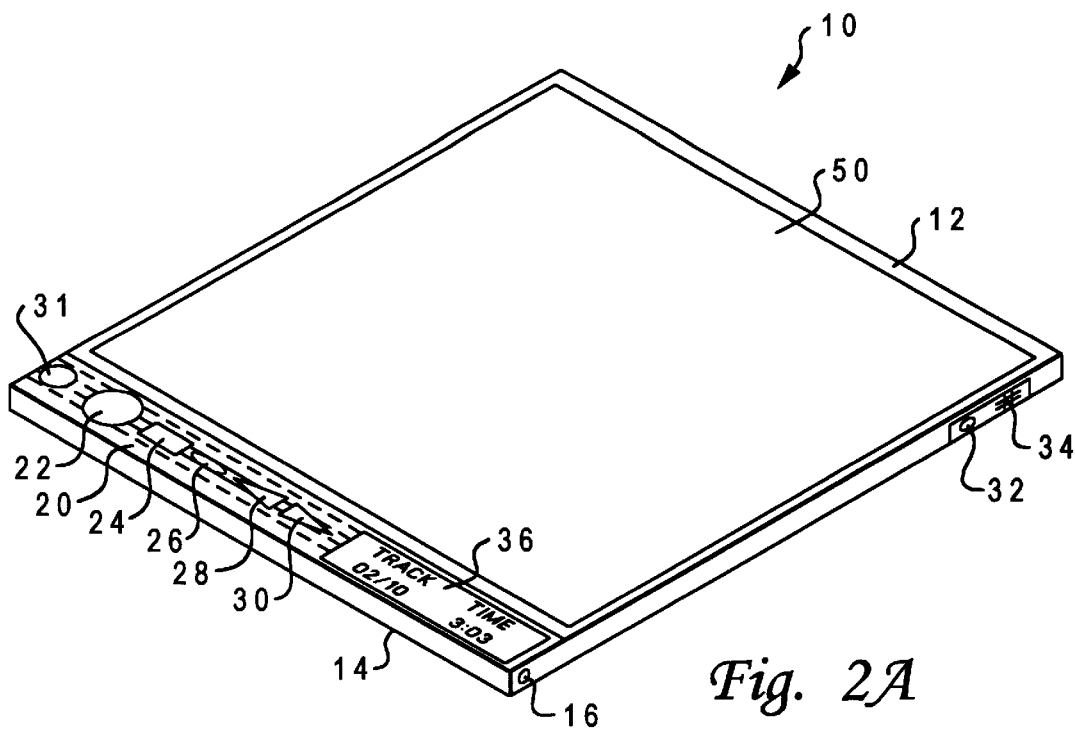
FIG. 2A is a perspective view of one embodiment of a closed, play-in-place jewel case for housing and playing an audio CD, constructed in accordance with the present invention.
Figure 2B:
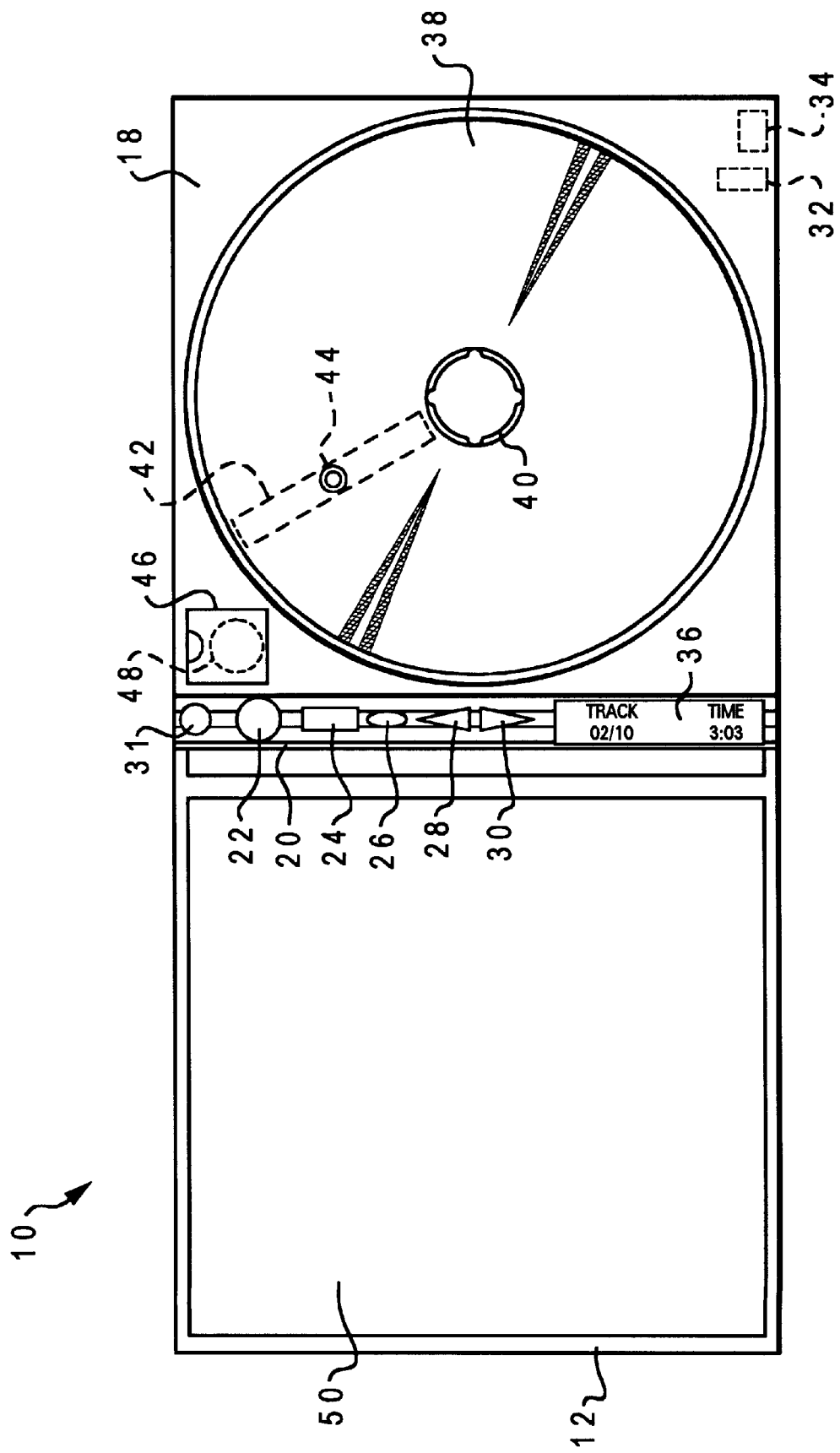
FIG. 2B is a top plan view of the play-in-place jewel case of FIG. 2A, in the open position, with a CD held therein.

With reference now to the figures, and in particular with reference to FIGS. 2A and 2B, there is depicted one embodiment 10 of a "play-in-place" audio compact disc (CD) jewel case. Case 10 has a top cover 12 which is hinged to a base 14 at two hinge points, one of which is indicated at 16. An inner shell 18 (see FIG. 2B) is located within case 10, and a landing portion 20 formed integrally with shell 18 is raised along the hinge line, forming a spine area, similar to the spine area of the case 1 of FIGS. 1A and 1B. However, in case 10, the spine area houses electronic components which form the basis of an audio CD player system. These components include a volume control knob 22, and several playback controls which, in this embodiment, include a stop button 24, a play/pause button 26, a reverse button 28, and a forward button 30. An on-off button 31 is also provided. These controls may be recessed into landing area 20 to avoid accidental actuation, and to keep the profile of case 10 along this section slim.

Volume control knob 22 is used to adjust the gain in the audio signals provided to a stereo headphone jack 32 and a speaker 34. Jack 32 is adapted for industry-standard headphones, such as those used with portable radios and existing CD players. The headphone jack could also be used to connect jewel case 10 to a larger stereo system, thus allowing the jewel case to be treated as a source component in the larger system.

Stop button 24 stops playback of the disc if the unit is in playback mode. Playback button 26 is used to begin playback when the unit is stopped, or to pause the playback until play/pause button 26 is depressed again (or until one of the other buttons is depressed). Forward button 30 moves the playtime of the track forward while pressed and held down during playback, or skips to the next track on the disc if button 30 is just hit and released. Reverse button 30 moves the playtime of the track backward while pressed and held down during playback, or skips backward a track if it is just hit and released.

The current track and amount of time elapsed in the track may be displayed on a track/time display 36 also located on landing area 20. Track/time display 36 may be, for example, an inexpensive liquid crystal display (LCD), and may also be used for system messages (such as "NO CD" when case 10 is empty, or "ERROR" if the CD cannot be read due to damage).

Case 10 is shown in the open position in FIG. 2B. Shell 18 provides a cavity for receiving an audio CD 38. A spindle or capstan drive 40 emanates from the center of this cavity. Capstan 40 is sized to fit snugly within the center hole of CD 38, and may be provided with a detent mechanism such as spring-loaded balls which snap over CD 38 to hold it in place. Capstan 40 is affixed to a drive motor 40a (FIG. 2B). Shell 18 also has a slot 42 formed in the cavity portion, which accommodates a sliding optical head 44 used to read the optically-encoded data on CD 38. A removable cover 46 provides access to a compartment within shell 18 housing a battery 48 which provides power to the entire electrical system.

Placement of the various controls as described efficiently uses the space in the spine area under landing 20 which is wasted in prior art designs, while placement of the speaker, headphone jack, and battery efficiently uses space defined by shell 18 which again corresponds to wasted space under the retainer place of the prior art CD case. In this manner, case 10 can provide full playback support, and still occupy the same space as a conventional CD case, about 14 cm×12.5 cm×10 mm, and can be stored in conventional CD storage racks, etc. The thickness of player/case 10 is thus no more than about eight times the thickness of the media (CD 38).

Cover 12, base 14 and shell 18 may be constructed of any rigid, durable material, preferably a polymer. Cover 12 is further preferably fabricated from a clear material to allow the viewing of a printed sheet which may be inserted under the cover. Alternatively, in a further enhancement of the present invention, a clear cover is used to allow viewing of a graphic display panel 50 that is affixed to the interior surface of cover 12. Graphic display panel 50 utilizes flat-screen technology (e.g., active matrix LCD panel) to display images which may be available from the media in another format (e.g., DVD format). Accordingly, the front of the jewel case, which previously displayed only static artwork, may now be used to dynamically display various images, such as graphics, film clips, song lyrics, etc. The display panel could be attached to the base instead of the cover (or two panels could be provided).

In another variation of the foregoing, display panel 50 is operatively combined with a touch screen 50a (FIG. 3) laminated to the exterior surface of cover 12. A simple touch screen interface programmed into the unit allows the listener to navigate through the visual content of the enhanced format CD, all being displayed in the jewel case's display panel 50.

Figure 3:
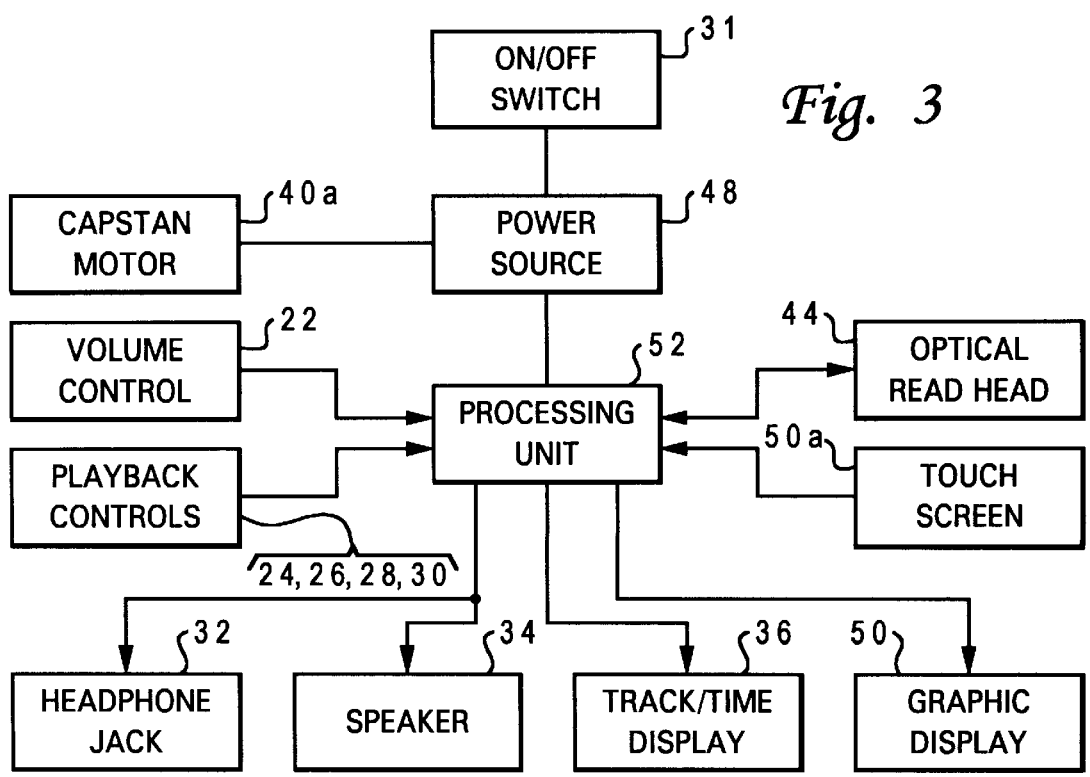
FIG. 3 is a block diagram of the electrical components used in the play-in-place case of FIGS. 2A–2B.

The various components of the electrical system of play-in-place case 10 are shown in FIG. 3. Switch 31 is connected to power source (battery) 48, which powers the capstan motor 40a than spins disc 38, and a processing unit 52. Processing unit 52 controls the outputs of the player/case, including headphone jack 32, speaker 34, track/time display 36, and graphic display panel 50. The details of the actual media used, and the delivery mechanisms for such media, are dependent upon the format used, and are known to those skilled in the art. Volume control 22 and control buttons 24–30 feed into processing unit 52, as does touch screen 50a. Another jack (not shown) may be provided to allow case 10 to be powered by AC voltage using an external AC adapter (also not shown).

It is understood that not all of the elements depicted in FIG. 3 are required to practice the present invention. For example, only one of the speaker and headphone jack is actually required, although both are desirable (and more than one headphone jack may be provided). As explained above, graphic display panel 50 and touch screen 50*a* are optional features. Also, the playback controls may vary from those specifically described.

With this invention, each CD jewel case becomes a physical play-in-place CD player. Instead of an external CD player, all the listener needs is a simple headphone in order to enjoy listening to the CD. Mini-speaker technology is rapidly improving, and decent quality mini-speakers are feasible, so that even a headphone is not required. A physical play-in-place CD jewel case constructed in accordance with the present invention thus personifies ease of use and is totally self-contained. Moreover, when someone wants to listen to a CD, there is no need to remove the CD from its protective packaging, and expose it to possible damage.

Although the invention has been described with reference to specific embodiments, this description is not meant to be construed in a limiting sense. Various modifications of the disclosed embodiments, as well as alternate embodiments of the invention will become apparent to persons skilled in the art upon reference to the description of the invention. For example, the invention is not limited to audio compact discs, but could be further applied to, e.g., video laser discs, or even other types of media, such as a microchip or digital audio tape. The benefits remain the same, regardless of storage media. It is therefore contemplated that such modifications can be made without departing from the spirit or scope of the present invention as defined in the appended claims.

What is claimed is:

1. A physical play-in-place case for housing and playing a media disc, the case comprising:
   a base;
   a shell attached to said base, defining a cavity for receiving a media disc, said shell further having a landing portion defining a spine area extending substantially along a common side of said base and said shell;
   means, located in said shell, for reading data encoded on the media disc;
   means, at least partially located in said spine area of said shell, for playing back media content contained in the encoded data; and
   a cover hinged to said base along said spine area such that said cover may be moved between an open position and a closed position, wherein the media disc may be accessed in said open position, and the media disc is protectively enclosed in said closed position, wherein said base and said cover are generally rectangular and, with said cover in said closed position, the case has dimensions no greater than about 14 cm×12.5cm×10 mm.

2. The physical play-in-place case of claim 1 wherein said reading means includes drive means located in said shell for spinning the media disc, said drive means including a capstan having means for releasably receiving the media disc.

3. The physical play-in-place case of claim 1 wherein:
   the data is optionally encoded on the media disc; and
   said reading means includes a movable optical head.

4. The physical play-in-place case of claim 1 wherein said playing means includes a graphic display panel attached to one of said base and said cover, such that said graphic display panel may be viewed when said cover is in said closed position.

5. The physical play-in-place case of claim 4 wherein said playing means further includes a touch screen operatively combined with said graphic display panel.

6. The physical play-in-place case of claim 1 wherein said playing means includes a plurality of controls located at said landing portion of said shell and extending into said spine area of said shell.

7. The physical play-in-place case of claim 6 wherein said playing means further includes at least one audio output device located in said shell.

8. The physical play-in-place case of claim 6 further comprising a track/time display located at said landing portion of said shell.

9. A physical play-in-place case for housing and playing a media disc, the case comprising:
   a generally rectangular base;
   a shell attached to said base, defining a cavity for receiving a media disc, said shell further having a landing portion defining a spine area extending substantially along a common side of said base and said shell;
   a generally rectangular cover hinged to said base along said spine area such that said cover may be moved between an open position and a closed position, wherein the media disc may be accessed in said open position, the media disc is protectively enclosed in said closed position and, with said cover in said closed position, the case has dimensions no greater than about 14 cm×12.5 cm×10 mm;
   means, located in said shell, for reading data optically encoded on the media disc, said reading means including
      drive means located in said shell for spinning the media disc, said drive means including a capstan having means for releasably receiving the media disc, and
      a movable optical head;
   means for playing back media content contained in the optically encoded data, said playing means including
      a plurality of controls located at said landing portion of said shell and extending into said spine area of said shell,
      at least one audio output device located in said shell,
      a graphic display panel attached to one of said base and said cover, such that said graphic display panel may be viewed when said cover is in said closed position, and
      a touch screen operatively combined with said graphic display panel;
   a track/time display located at said landing portion of said shell; and
   battery means located in said shell for providing power to said reading means and said playing means.

* * * * *